United States Patent [19]
Thompson

[11] Patent Number: 4,585,927
[45] Date of Patent: Apr. 29, 1986

[54] APPARATUS FOR PREDICTING THE EXACT TIME OF CURRENTS IN TERMS OF THE YEAR, MONTH, DAY AND HOUR

[76] Inventor: Harold L. Thompson, 10478 Goodwood Blvd., Baton Rouge, La. 70815

[21] Appl. No.: 703,912

[22] Filed: Feb. 21, 1985

[51] Int. Cl.⁴ .............................................. G06G 1/02
[52] U.S. Cl. .............................. 235/70 R; 235/70 A; 235/85 R; 235/89 R
[58] Field of Search ...................... 235/69, 70 R, 70 A, 235/89 R, 61 R, 85 R

[56] References Cited

U.S. PATENT DOCUMENTS 3,902,656  9/1975  Rothchild .................... 235/70 R X
4,230,936  10/1980  Oerth ........................ 235/85 FC X

*Primary Examiner*—Benjamin R. Fuller
*Attorney, Agent, or Firm*—Proctor A. Llewellyn

[57] ABSTRACT

Apparatus for presenting tidetable data in a form visually readable to the average person in terms of the year, month, day and hour of occurrence, exacting information regarding current flow, i.e. the direction of current flow, the relative strength of current flow, and the period of current flow, at a given location. A preferred apparatus is comprised of a stator, and slide. The stator is suitably an elongate member along a horizontal side of which days of the week are scribed and scaled off in consecutive order, preferably with each daily period being further sub-divided into a morning period and evening period. The morning and evening periods are in turn sub-divided into hourly periods. A vertical scale provided on the stator ranges from a base line of zero upwardly, or in a positive direction, to a high point representative of the tidal range, and downwardly below the base line of 0, or in a negative direction, to a low point representative of the tidal range. The tidal range, suitably in feet, is representative of the rise and fall of the surface of the water, at the given geographic location. The slide, which is carried by the stator, is scribed with a generally sinuous wave form representative of the tidal range, suitably in feet, at a given location for each consecutive daily period over the range of data of a given period. The amplitude of the sinuous wave form is read from the vertical scale of the stator, for a given week day, or hourly period, as scribed upon the horizontal scale of the stator. From the lunisolar information given in this manner one can readily predict and observe, for the location, the precise hourly periods of current flow on any given day of the year, and their strength, direction and duration.

6 Claims, 3 Drawing Figures

APPARATUS FOR PREDICTING THE EXACT TIME OF CURRENTS IN TERMS OF THE YEAR, MONTH, DAY AND HOUR

FIELD OF THE INVENTION

This invention relates to an apparatus, and method, for providing precise visual information regarding the direction of current flow, strength of current flow, and duration of current flow for any given year, month, day and hour at a given geographic location.

BACKGROUND AND PROBLEMS

Tides, the periodic rise and fall of the surface of the waters of the earth, are produced principally by the gravitational forces and relative motion between the earth, the moon and the sun. The lunar tide is produced by differences between the constant centrifugal force which acts upon the earth and the gravitational force which tends to draw the earth and the moon towards one another. The greatest gravitional force of attraction is at that point on the earth's surface nearest the moon, while the weakest force of attraction upon the earth's surface is on the opposite side of the earth's surface. There is thus a high water bulge on the earth's surface on the side toward the moon, and another bulge on the side of the earth away from the moon. There is produced a low-water trough on each side of the earth between the bulges. The half lunar day is 12 hours and 25 minutes, which is the time interval between successive high tides, or low tides. An approximately nineteen year period is required for the regression of the moon's nodes to complete a circuit of 360° in longitude. The sun produces upon the earth a solar tide in similar fashion for similar reason, though the effect of the sun on tides is about 46 percent of that of the moon because, despite its mass it is far more distant from the earth. Tidal analysis, for these reasons requires a consideration of the cumulative effects of both the moon and the sun, as well as a consideration of the location of the earth, the moon and the sun one in relation to the other; which differs at different times of the year. These effects are cyclic, and predictable, and annual tidetables are published by the U.S. Coast and Geodetic Survey for the entire world. Each volume contains daily predictions for key places and tables of time and height differences for secondary sites. There are two annual volumes of tidal current tables, primarily for places in North America. Meteorological tides, or tides produced by earthquakes, variable atmospheric pressure and wind, are not predictable, or cyclic, but their effect is generally far less pronounced than that of lunisolar tides.

Ocean tides are directly affected by the positions, and relative movement of the moon and the sun. Ocean tides also profoundly effect the flow of water into and out of estuaries. In restricted channels too a restricted stream exhibits a regular pattern of ebb and flood. In an estuary the current continues to flow upstream for a considerable time after high water. The current in an estuary runs downstream similarly after low water. A flood current is produced when the current is directed toward land, or up an estuary. Conversely, an ebb current is produced when water runs away from the land, or down an estuary.

The time of high water is directly related to the positions of the moon and sun. The length of time between the moon's crossing of the meridian at a given place on the earth and the next high water at that place is known as the lunitidal interval, or the high water interval for that particular place. Similarly, the length of time between the moon's crossing at that place and the next low water is called the low water interval. The duration of the mean rise and fall of tides for a given coastal site is calculated empirically to provide average conditions over a nineteen year cycle, and this information is published in tidetables. Tides are constituted of semi-diurnal, diurnal components and mixed components. The sea shores, river estuaries and tide channels exhibit tidal profiles. Even though tides can be of approximately 5 hour flood and 7 hour ebb, the duration of the average interval between successive high water and low water of semi-diurnal tides is normally 6 hours and 13 minutes, and between successive high waters 12 hours and 25 minutes.

The mechanism of feeding behavior in fishes is complicated and only partially understood. Nonetheless, fishermen have long believed, and have probably observed, that fish generally bite better when the tide is running. Conversely, they believe, and have probably observed, that fish do not generally bite well when there is no current. It is thus believed that the current pushes the small animals on which fish feed, and smaller fish out of their hiding places to excite the curiosity and rapacity of the larger fish; this making the smaller fish more vulnerable to attack by the larger fish. The flow of water is thus associated with a connected series of events which brings about meal time for the fish, the large fish feeding on the smaller fish, and they in turn providing food for yet larger fish. Fish, according to species and prevailing conditions such as the time of year, temperature, and time of day feed just under the surface or at various depths right down to the bottom of the water, but essentially always in relation to the strength of the current. Knowing at a given location the date and time that currents will occur, it is postulated, would be of keen interest to fishermen. Such information should also be of considerable interest to those who navigate such waters. Unfortunately however tidetables issued periodically by the National Ocean Service for specific locations obscure at best the periods of current flow, and do not indicate when currents will be sufficient to bring animals and fish as food from their hiding places to initiate the feeding cycle. Rather, these tables show, over a 24 hour period for any given year, month, and date, for a given location, the predicted hourly heights of the surface of the water on an hourly basis. Such data offers little if anything intelligible to one in need of exacting information, at a given location, regarding the exact time and periods when currents will occur, and the relative strength of current flow.

OBJECTS

It Is, accordingly, the primary objective of the present invention to provide an apparatus which will fill such need.

In particular, the object of the present invention is to provide apparatus for presenting tidetable data in a form visually readable to the average person in terms of the year, month, day, and hour of occurrence, exacting information regarding the direction of current flow, strength of current flow, and duration of current flow at a given location.

A specific object is to provide apparatus which can be manipulated and set with relative ease to provide information regarding current flow, strength of the current flow, and period of current flow, at or near a given location on which the apparatus is based, for a selected year, month, date and hour, or hourly period.

THE INVENTION

These objects and others are accomplished in accordance with this invention, the apparatus embodiment of which is comprised of a first member, preferably a stator or base member, and a second member, preferably a slide. The stator, or base member, is suitably an elongate member along a horizontal side of which days of the week are scribed and scaled off in consecutive order, preferably with each daily period being further subdivided into two periods, A.M. (ante meridiem) and P.M. (post meridiem); and these latter periods into hourly periods representative of the morning hours and evening hours, respectively. A vertical scale upon the stator, or base member, ranges from base line of "0" (zero) upwardly, or in a positive direction, to a high point representative of the tidal range, and downwardly below the base line of 0, or in a negative direction, to a low point representative of the tidal range. The tidal range, suitably in feet and sub-divisions thereof, is representative of the amplitude of the rise and fall of the surface of the water, at the given location, as provided by tidetables furnished by the National Ocean Service. The slide, which is carried by the stator, is scribed with a generally sinuous wave form representative of the tidal range, suitably in feet, at a given location for each consecutive daily period over the range of data of a given period. The amplitude of the sinuous wave form is read from the vertical scale of the stator, for a given week day, or hourly period, as scribed upon the horizontal scale of the stator. From the lunisolar information given in this manner one can readily observe, for the location, the precise hourly periods of current flow on any given day of the year, the direction of current flow, the relative strength, and duration of current flow.

The characteristics of a preferred apparatus, and the principle of its operation, will be more fully understood by reference to the following detailed description, and to the attached drawing to which reference is made in the description. The various features and components in the drawing are referred to by numbers, similar features and components being represented in the different figures by similar numbers. Subscripts are used in some instances with numbers where there are duplicate features and components.

In the drawing:

FIG. 1 depicts a front view of a preferred apparatus inclusive of a stator, which contains a horizontal scale scribed with the seven days of the week, and an alternately disposed pair of vertical scales representative of the tidal range in feet, and a slide fitted therein on which is scribed, for a given geographic location, a sinuous curve representative of the tidal range over a given week in this instance e.g. March 5 through March 11 year 1985.

Figure 1:
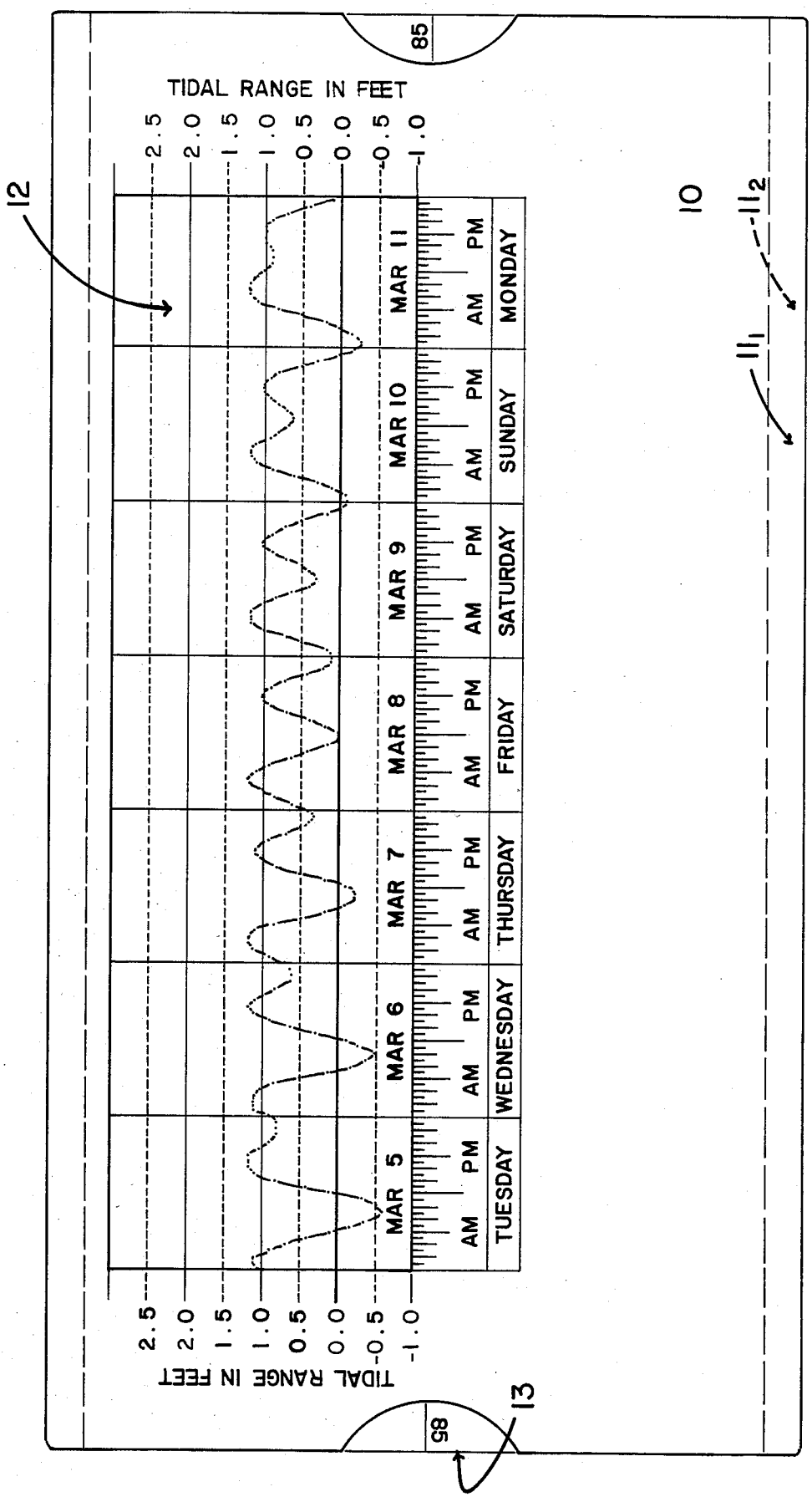

Referring first to FIG. 1 there is shown an apparatus 10 useful for predicting the daily flow of current, the direction, the strength, and duration thereof, the basic structural components of which include a stator 11, and slide 13. The stator 11 is constituted of a pair of elongated planar member $11_1$, $11_2$ (i.e. a front planar member, or panel $11_1$, and a rear planar member, or panel $11_2$) of similar size the top and bottom edges of which are sealed together to form an integral unit. The left and right edges of the stator 11 are left open, and unsealed forming in effect a sheath-like structure within which a slide 13 can be fitted. The left and right sides of the planar member $11_1$, at about the mid portion thereof, are notched or cut-away to provide ease of access for gripping a slide 13 to push it into the stator 11, to remove it from the stator 11, and to allow adjustment of the slide for time differences between different known geographic locations influenced by the same tidal waters at different time periods. The sheath-like opening through the stator 11, it will be noted, is of slightly greater width than the width (narrower dimension) of the slide 13 to reduce resistance to the movement of the slide 13 into and out of the stator 11. A few hundredths of an inch extra width is generally about all that is required to reduce this effect. The stator 11 is in effect, and as a preference, constructed of two flat sheets of similar size formed into an open-end sheath into and through which a slide can be fitted, removed, and replaced as desired with a slide of similar structure. The front panel $11_1$ of the stator 11 is provided with an opening or window 12, preferably of rectangular shape, through which indicia scribed upon the exposed face of the slide 13 can be viewed.

The front panel $11_1$ of the stator 11 is scribed, just below the window 12 of the front panel $11_1$, with indicia representative of the seven days of the week; the days of the week favored by sports fishermen being scribed for convenience to the right side of the scale—viz. Friday through Monday, or Saturday through Monday, though obviously the days may be consecutively listed beginning and ending with any day of the week, as desired; or the selected period may be any one or more preselected days, as desired.

Each individual day on the horizontal scale on panel $11_1$, below window 12, is further sub-divided into hours, twelve morning hours (12 AM to 12 PM) and twelve evening hours (12 PM to 12 AM), for a total of twenty-four hours. For convenience, a vertical scale representative of the tidal range in feet is provided at both the left side of the window 12, and at the right side of the window 12 of panel $11_1$. Normal sea level is defined on the horizontal scale as the zero, or "0" level. For convenience, the scale shows that the surface level of the water can rise to 2.5 feet, and can be depressed below normal as much as 1.0 foot, i.e. −1.0 feet.

Lunisolar tides as has been discussed are cyclic over a 19 year period, and predictable. The National Ocean Service has provided such data to the public over many years in the form of tables listing, over a 24 hour day of any given day and month of any given year the tidal height in feet at, if not all, most of the ports of this Country. For example, the predicted hourly heights, or rise and fall of the surface level of water relative to normal in the Galveston Channel, at Galveston, Tex., on the dates of Tuesday, March 5 through Monday, March 11 for the year 1985 are given from a computer printout as follows;

Galveston, Galveston Channel T.M. 90W
Predicted Hourly Heights March, 1985 Datum .800
*NOAA, National Ocean Service
Standard Time

| Day | Hours 0/12 | Hours 1/13 | Hours 2/14 | Hours 3/15 | Hours 4/16 | Hours 5/17 | Hours 6/18 | Hours 7/19 | Hours 8/20 | Hours 9/21 | Hours 10/22 | Hours 11/23 |
|---|---|---|---|---|---|---|---|---|---|---|---|---|
| 5 Tu | 1.0 | 1.1 | 1.1 | .9 | .7 | .4 | .1 | −.2 | −.5 | −.6 | −.5 | −.3 |
|  | .1 | .4 | .8 | 1.1 | 1.2 | 1.2 | 1.2 | 1.0 | .9 | .8 | .8 | .8 |
| 6 W | .9 | 1.1 | 1.1 | 1.1 | 1.0 | .8 | .5 | .1 | −.2 | −.4 | −.5 | −.3 |
|  | −.1 | .3 | .6 | .9 | 1.1 | 1.2 | 1.1 | 1.0 | .8 | .6 | .6 | .6 |
| 7 Th | .7 | .9 | 1.1 | 1.2 | 1.2 | 1.1 | .8 | .5 | .2 | −.1 | −.2 | −.2 |
|  | −.1 | .2 | .5 | .8 | 1.0 | 1.1 | 1.1 | .9 | .7 | .5 | .4 | .3 |
| 8 F | .4 | .6 | .8 | 1.0 | 1.2 | 1.2 | 1.1 | .9 | .6 | .4 | .1 | .0 |
|  | .0 | .2 | .4 | .7 | .9 | 1.0 | 1.0 | .9 | .7 | .4 | .2 | .1 |
| 9 Sa | .1 | .2 | .5 | .7 | 1.0 | 1.2 | 1.2 | 1.2 | 1.0 | .8 | .6 | .4 |
|  | .3 | .4 | .5 | .7 | .9 | 1.0 | 1.0 | .9 | .7 | .5 | .2 | .0 |
| 10 Su | −.1 | −.1 | .1 | .3 | .6 | .9 | 1.1 | 1.2 | 1.2 | 1.1 | .9 | .8 |
|  | .7 | .6 | .7 | .8 | .9 | 1.0 | 1.0 | .9 | .8 | .5 | .3 | .0 |
| 11 M | −.2 | −.3 | −.2 | .0 | .2 | .5 | .8 | 1.1 | 1.2 | 1.2 | 1.2 | 1.1 |
|  | 1.0 | .9 | .9 | .9 | 1.0 | 1.0 | 1.0 | 1.0 | .9 | .7 | .4 | .1 |

Thus, the specific data points are given hourly over a 24 hour period, on a top line for a given day from time zero (12 AM) through 11 hours (11 AM), and on a bottom line for a given day from 12 hours (12 PM) through 23 hours (11 PM). These points have been plotted on the slide 13 over a scale of seven days corresponding to those shown on the horizontal scale of panel 11₁, and these points have been linked, or joined together by the locus of a series of plots made between these points to form the sinuous wave depicted in FIG. 1. As to the more pronounced periods of current flow, these data show that on Tuesday, March 5 a major, or strong current flows outwardly from the Channel between the hours of about 3 AM and 7 AM, and inwardly into the Channel from about 11 AM until 2 PM. On the same day, i.e. on Tuesday, March 5, a weak ebb current starts at about 6 PM, and at about 9:30 PM on the same day the current is reversed to provide a weak flood current. The sinuous curve that is depicted is thus representative of the relative quantity of water movement, as well as its direction, strength and timing. On Wednesday, March 6 the ebb tide produces a strong current which occurs between about 4 AM and 8 AM, and the flood tide produces a major current between about 11 AM and 3 PM. On Thursday, March 7 the ebb tide produces a less strong, or moderate current which occurs between about 6 AM and 10 AM, and the flood tide a moderate current which occurs between about 1 PM and 4 PM. A second ebb tide produces a less moderate current which occurs on March 7 between about 7 PM and 10 PM, but the rate of current flow is less vigorous than during the other periods mentioned for that date. On Friday, March 8 the ebb tides as shown by reference to FIGS. 1 and 3 produce moderate to strong currents which occur between about 5 AM to 10 AM and between about 7 PM to 10 PM. A flood tide produces a current which occurs on March 8 between about 12 AM and 3 AM and between about 1 PM and 4 PM. Flood tides produce currents on Saturday, March 9 between about 1 AM to 4 AM and about 12 PM to 4 PM, and ebb tides produce currents between about 8 AM to 11 AM and about 7 PM and 11 PM. The current which occurs between about 7 PM and 11 PM on Saturday, March 9 is stronger and more vigorous than those which occur during other periods on this date. On Sunday, March 10 the flood tide produces a moderately strong current between the hours of about 1 AM to 6 AM, and the ebb tide produces moderate to strong current between about 7 PM to 11 PM. A weak ebb tide also occurs on this same day between 8 AM to 11 AM, and a weak flood tide between about 1:30 PM and 4 PM. On Monday, March 11 the flood tide produces a strong to very strong current between about 2 AM to 7 AM, and the ebb tide produces a vigorous current between about 8 PM to 12 AM.

Figure 2:
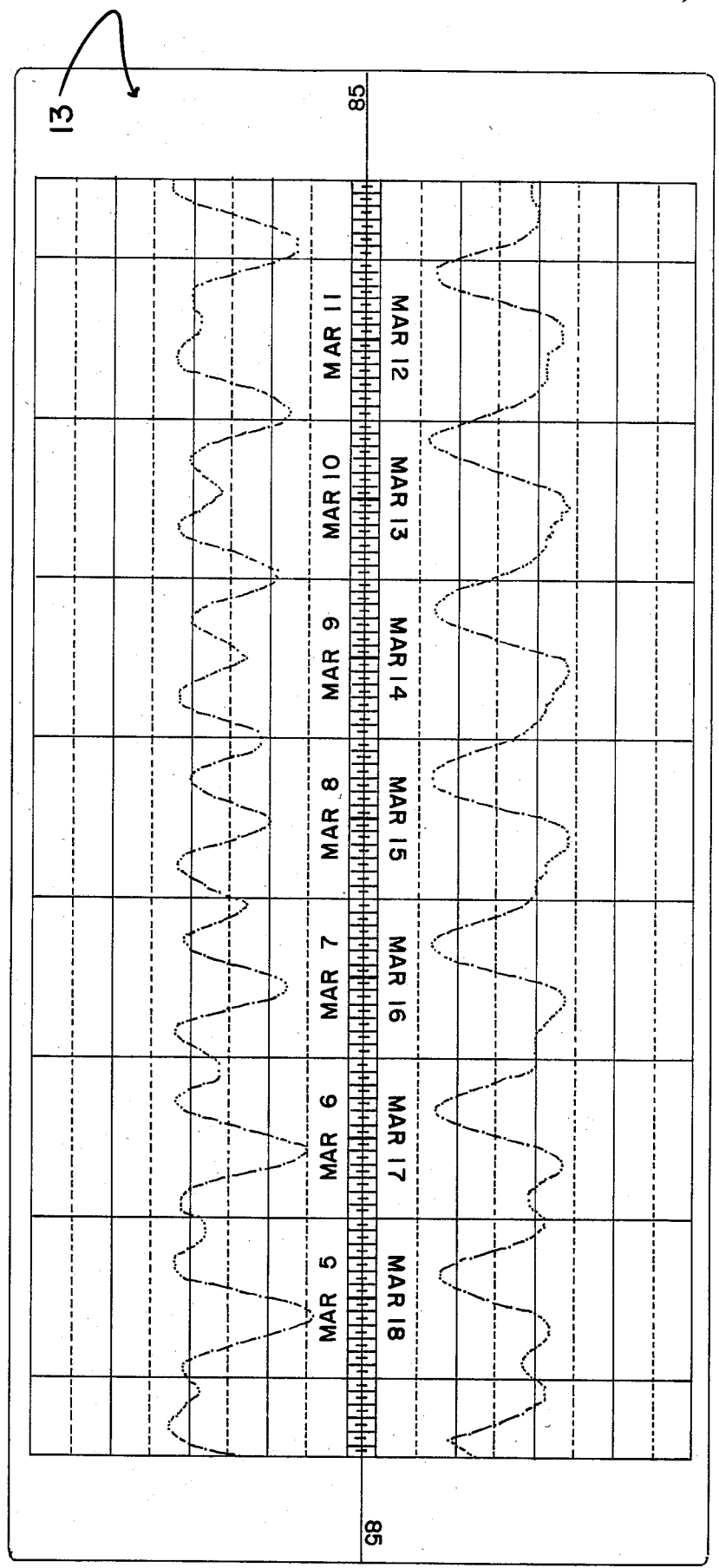
FIG. 2 depicts in detail a whole face of a preferred type of slide, a portion of which is visible through a window of the stator.

Suitably, data for all of the weekly periods over an entire 19 year lunisolar cycle from which the time of current flow, and periods of current flow, can be calculated and scribed on cards for use as slides 13 for any given port. In a preferred embodiment, thirteen cards are used to cover the data for any given year of this entire lunisolar cycle. Data covering two week periods can be scribed on each side of a slide 13, such that 13 slide cards can be used to cover an entire year's period. Such a card slide 13 is shown in FIG. 2, the face of the card slide shown covering the two week period between March 5 through March 18 of the year '85 (1985). The data covering the two weeks shown are reversably printed such that the card slide 13 need be reversed by 180° rotation and slid into the stator 11 for reading through the window 12. Data covering two consecutive weekly periods are similarly printed on the opposite side of the card slide 13.

Figure 3:
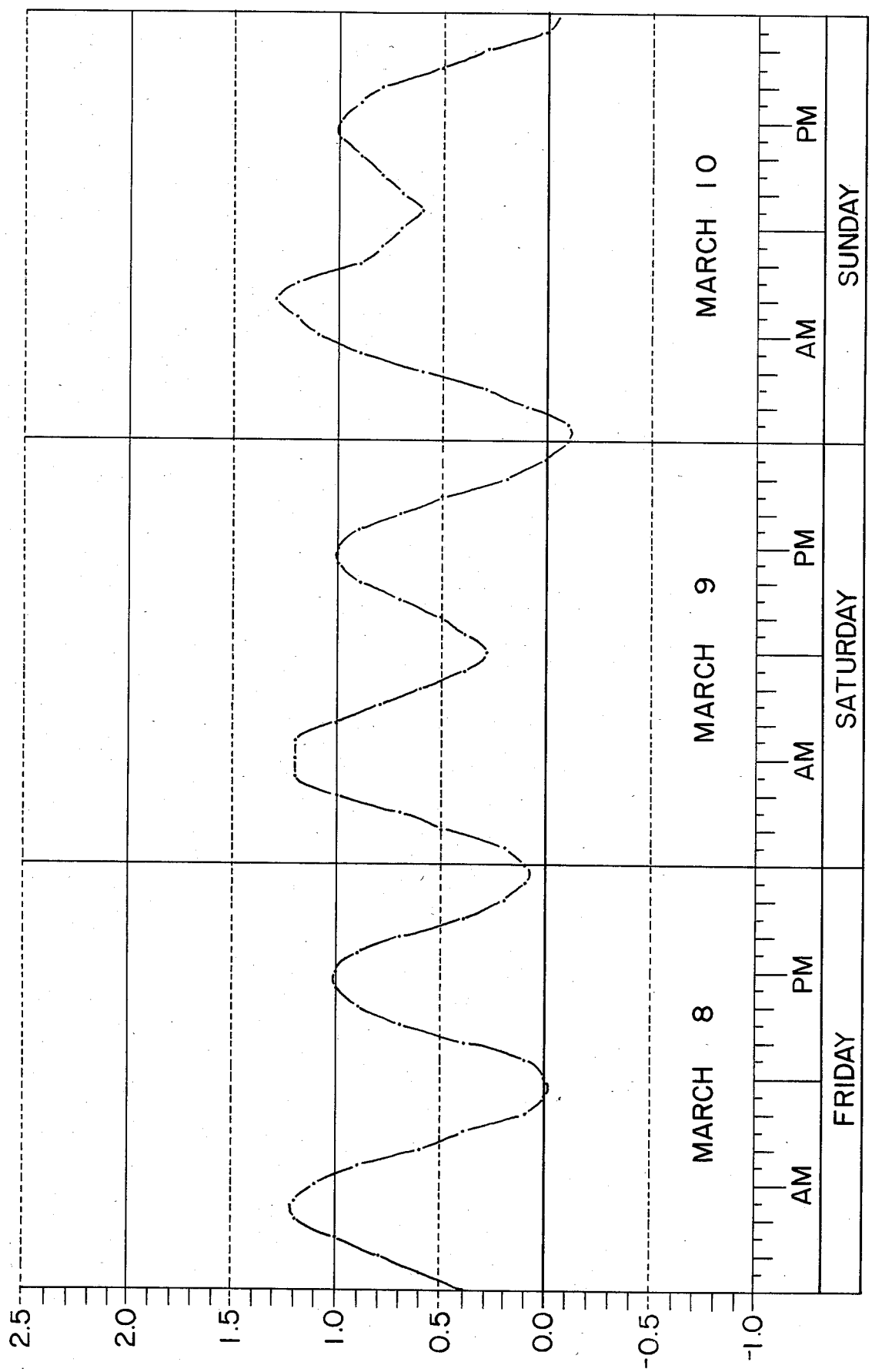
FIG. 3 depicts an enlarged segment of the slide of the preceeding figures, and portion of the stator; both being viewed alongside a scale representative of the tidal range in feet.

The data scribed on card slide 13 for Friday, March 8 through Sunday, March 10 for the year 1985 are enlarged, and shown in FIG. 3.

It is apparent that various changes, such as in the absolute or relative dimensions of the parts, materials of construction used, and the like in either the stator, or slide, or both, can be made without departing the spirit and scope of the invention, as will be apparent to those skilled in this art.

Having described the invention what is claimed is:

1. Apparatus useful for predicting for bodies of water upon the earth's surface the time of flow of currents, the direction of current flows, the strength and duration of the flow of currents, at a given geographic location, which comprises a stator scribed with indicia to form a scale representing a time period in days, and another scale representing hourly heights of the surface level of the water relative to a normal level, a slide scribed with a sinuous wave form of irregular shape representative of the tidal range over the period represented on said stator which can be fitted to and compared with the scale of values on said stator to determine the time of flow of currents, the direction, strength and duration of flow of currents.

2. The apparatus of claim 1 wherein the stator is constituted of two elongate sheets sealed together along the elongate edges thereof and open within the center to form a sheath within which the slide can be fitted, a front face of one of the elongate sheets is provided with a window through which indicia scribed upon the slide can be viewed, the front sheet of the stator is scribed just below the window with indicia representative of days of the week, and a vertical scale alongside the window representative of tidal range, which indicia can be compared and contrasted with the indicia of the slide to be visually read, to provide for a given geographic location, in terms of the year, month, day and hour of occurrence, exacting information regarding the direction of current flow, the strength, and duration of current flow.

3. The apparatus of claim 2 wherein the indicia scribed on the slide is in the form of a sinuous wave projected over a number of days corresponding to the number of days scribed on the horizontal scale below the window on the front sheet of said stator, the day and hour over which current flow occurs can be read from the horizontal scale on the stator, and the relative strength of the current can be read from the vertical scale on the stator opposite the window.

4. The apparatus of claim 3 wherein the relative strength and direction of the current can be read from either, or both, of a pair of vertical scales on the stator opposite the window.

5. Apparatus useful for predicting for bodies of water upon the earth's surface the time of flow of currents, the strength and periods of flow of currents at a given location, which comprises a stator constituted of two elongate sheets, a front sheet and a rearward sheet sealed together along the elongate edges thereof and open within the center to form a sheath, the front sheet is provided with a window, indicia scribed below the window to represent days of the week, and a vertical scale alongside the window representative of tidal range, a slide which can be fitted within the sheath between two sheets, the slide is provided with a sinuous wave form of irregular shape representative of the tidal range over the period represented on said stator, this scale when compared with the vertical scale of values on said stator is determinative of the time of flow of currents, and the strength and direction of the flow of currents.

6. The apparatus of claim 5 wherein the sinuous wave form representative of the tidal range is a plot made from the predicted hourly heights taken, for any geographic location, from lunisolar tidetable data supplied by the National Ocean Service, any point on the locus of points forming the sinuous wave form can be read on the horizontal scale of the stator to provide the day of the week and hour, and the tidal height read from the vertical scale of the stator such that the ebb and flood tides are readily discernable, as well as the relative strength and periods of flow of currents.

* * * * *